United States Patent [19]

Drechsler

[11] Patent Number: 4,574,486
[45] Date of Patent: Mar. 11, 1986

[54] TOP READING RULE USING BLADES WITH DIRECTIONAL ARROWS

[75] Inventor: Mark A. Drechsler, Southington, Conn.

[73] Assignee: The Stanley Works, New Britain, Conn.

[21] Appl. No.: 626,140

[22] Filed: Jun. 29, 1984

[51] Int. Cl.[4] ............................................. G01B 3/10
[52] U.S. Cl. .................................................... 33/138
[58] Field of Search ............................. 33/138, 137 R

[56] References Cited

U.S. PATENT DOCUMENTS

| | | | |
|---|---|---|---|
| 868,905 | 10/1907 | Besse | 33/137 R |
| 1,926,581 | 9/1933 | Clarke | 33/138 |
| 2,347,273 | 4/1944 | Lyle | 33/138 |
| 3,004,346 | 10/1961 | Quenot | 33/138 |
| 3,255,531 | 6/1966 | Anderson | 33/138 |
| 3,375,590 | 4/1968 | Quenot | 33/138 |
| 3,426,435 | 2/1969 | Ballard et al. | 33/138 |

FOREIGN PATENT DOCUMENTS 1241202  10/1960  France .................................. 33/138

*Primary Examiner*—Willis Little

[57] ABSTRACT

A top reading rule has a coilable blade with measuring indicia on both surfaces thereof. On its surface visible through the top reading window, the measuring indicia are offset from the outer end thereof and includes a longitudinally extending central band of a color distinct from the background and directional pointers spaced along the length of the band of a color distinct from that of the band. The pointers indicate the direction of increasing numbers so that a user may readily determine the length represented by graduations intermediate the numbers.

10 Claims, 5 Drawing Figures

TOP READING RULE USING BLADES WITH DIRECTIONAL ARROWS

BACKGROUND OF THE INVENTION

The present invention relates to coilable rules and more particularly to top reading rules with improved measuring indicia visible in the top reading window to facilitate the determination of the direction of numeric increase.

Top reading rules are gaining considerable acceptance because of ease in measuring dimensions between the outer end of the blade and the rearward end of the rule casing, while at the same time permitting use of the extended length of the blade for measuring distances therealong. Depending upon the size of the casing for the rule, the window in the top wall will have a finite length, particularly if one wishes to maintain substantial strength in the casing at reasonable cost. As a result in some top reading rules the window length will be such that only one number will be visible though the window and the user will have difficulty in reconizing whether an intermediate graduation is to be added to the visible number or whether the last lower number is at appropriate integer to use in determining the effective measured length. Moreover, frequently the indicia provided on the blade which are to be read through the window do not permit facile viewing from a number of directions.

It is the object of the present invention to provide a novel top reading rule wherein the blade is imprinted or otherwise provided with indicia facilitate user orientation as to the direction increasing dimension or numeric value on the surface of the rule blade visible through the top reading window.

It is also the object to provide such a top reading rule wherein the user's eye is caused to focus on directional pointers readily orienting the user as to the direction of increasing numbers on the top reading rule scale.

Another object is to provide such a rule in which the measuring indicia may be readily viewed from a number of directions and the user readily oriented as the direction of the blade indicia representing increasing numeric values.

SUMMARY OF THE INVENTION

It has now been found that the foregoing and related objects may be readily attained in a top reading rule which has a casing having side walls, top wall, bottom wall, front wall and rear wall defining an enclosure. A window is provided in its top wall and a blade aperture is provided adjacent the base of its front wall. Coiled in the enclosure of the casing is a rule blade which has an outer end portion extending outwardly of the aperture and an intermediate portion extending within the enclosure inwardly along the bottom wall, upwardly along the rear wall, and along the top wall under the window. The rule blade has a first set of measuring indicia on its face disposed upwardly as it extends outwardly of the blade aperture, and a second set of measuring indicia on the other face which are exposed as the blade extends under the casing window. The measuring indicia of the second set are offset from the outer end of the blade a distance equal to the length of the intermediate portion from the front wall to an indicium at the window minus the length of the bottom wall of the case. As a result, the distance between the outer end of the extended rule blade and the rear edge of the rule casing may be read at the point of registry of the blade visible through the casing window with the indicium at the window. The other or bottom face of the blade has a background of a first color, and the indicia of the second set are of a second color and include parallel graduations and numbers along the sides of the blade. The numbers are disposed oppositely to facilitate viewing from either side of the blade, and the indicia of the second set also include a centrally disposed, longitudinally extending band of a color distinct from the first color, and directional pointers spaced at intervals along the length of the band which are of a color distinct from that of the band. The pointers indicate the direction of increasing numbers, and the intervals between them are of a length less than the length of the window to ensure that at least one of the pointers is always visible in the window to permit ready determination of the value of intermediate graduations between numbers along the length of the rule between numbers.

In the preferred embodiment, the pointers are disposed within the width of the band, and the band is provided by discrete, spaced segments. Desirably, the pointers are arrowheads disposed within the segments, and the intervals between pointers are not greater than the spacing between numbers.

Preferably, the pointers are provided centrally of the spacing between numbers, and the window has an indicator line thereon providing the indicium aligned with an indicium on the rule blade reflecting the measured length. Conveniently, the first set of indicia is generally similar to the second set except for the omission of the pointers.

DETAILED DESCRIPTION OF THE ILLUSTRATED EMBODIMENT

Figure 1:
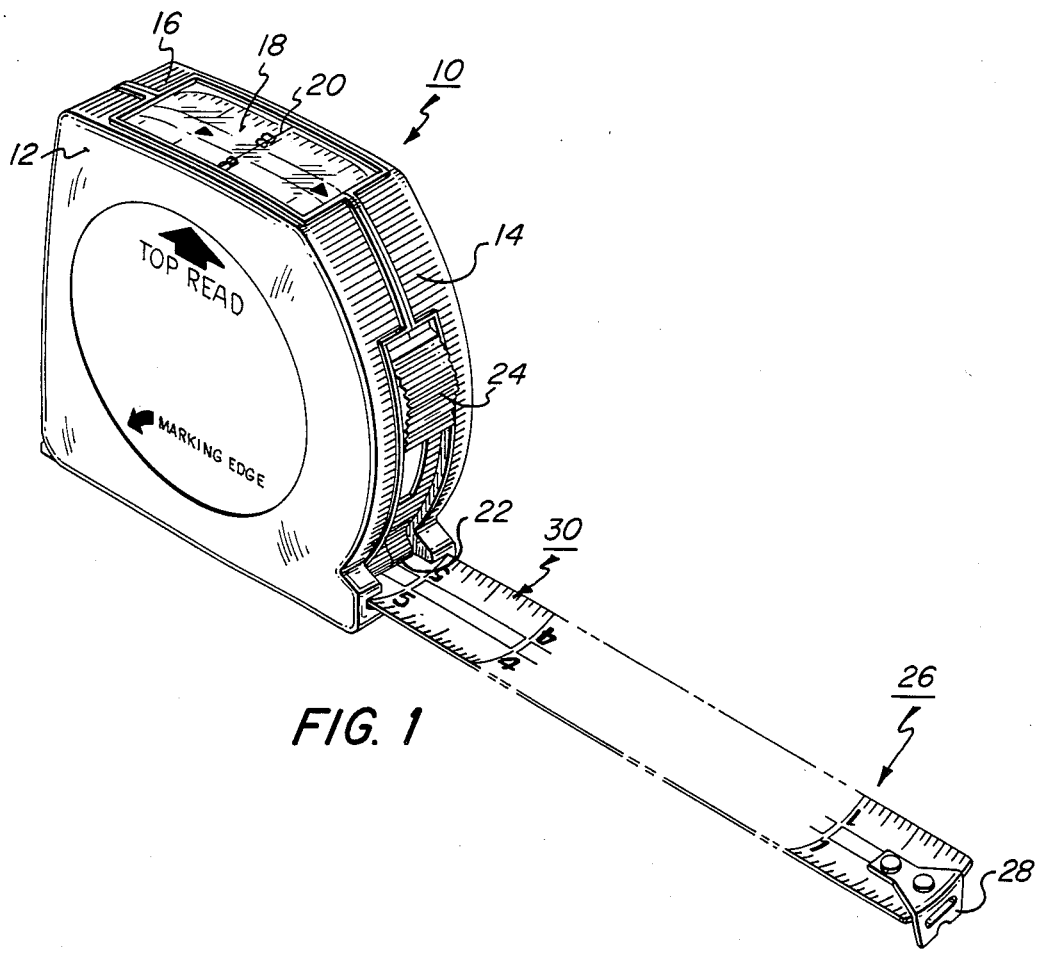
FIG. 1 is a perspective view of a top reading rule embodying the present invention with the coilable rule blade partially extended.

Turning first to FIG. 1, therein illustrated is a top reading rule embodying the present invention and comprised of a casing generally designated by the numeral 10 in which is coiled a metallic rule blade generally designated by the numeral 26.

The casing 10 has spaced side walls 12, a front wall 14, a top wall 16 and bottom and rear walls (not seen) which define an enclosure for the coiled blade 26. The top wall 16 has a window 18 therein through which the indicia on the rule blade 26 may be seen and an indicator line 20 thereon for registration with the graduation on the rule blade 26 representing the measured length.

The front wall 14 of the casing 10 has a blade aperture 22 adjacent its lower end and through which the blade 26 extends. A lock mechanism 24 is slidably supported on the front wall 14 to lock the blade 26 in an extended portion. Illustrative of such lock mechanisms is that illustrated and described in U.S. Pat. No. 3,214,836 granted to the assignee of the present invention as assignee of Robert F. West.

Figure 2:
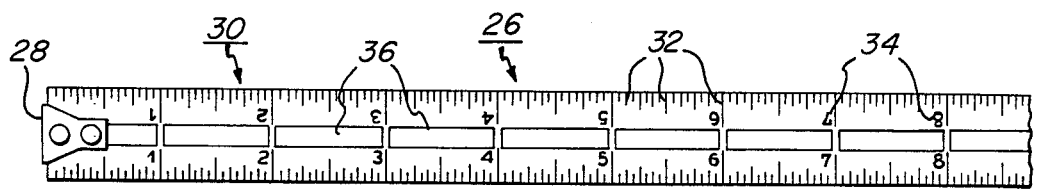
FIG. 2 is a fragmentary plan view of the rule blade surface disposed upwardly as seen in FIG. 1.

Turning now to the rule blade 26, it is a coilable metallic strip with a hook 28 at its outer end and it has indicia generally indicated by the numeral 30 printed on its upper face as extended from the rule casing 10 (seen in FIGS. 1 and 2) and indicia generally designated by the numeral 30A on its other face (seen in FIGS. 3 and 4), which face is that normally oriented downwardly in the blade extended position of FIG. 1.

The blade 26 extends inwardly through the casing aperture 22 and towards the rear wall thereof adjacent the bottom wall, thence upwardly behind the coiled portion, and spring motor if used, (not shown), thence forwardly under the window 18 and thence downwardly into the coiled portion. It will be appreciated that the reversal of direction within the casing 10 results in disposition adjacent the window 18 of the lower face of the rule blade, i.e., that opposite the face seen in FIG. 1.

The indicia 30, 30A both are imprinted or otherwise provided on the blade 26, and each includes parallel sets of lines or graduations 32 along the side margins of the blade 26 with sets of numbers 34 along the side margins indicating at least the increasing integers or whole units of length represented by the graduations 32 (inches and feet, or meters and centimeters and/or decimeters). Extending longitudinally and centrally of the blade 26 in at least the indicia 30A is a central band 36 which, in the illustrated embodiment, is comprised of discrete, closely spaced elongated rectangular segments.

Disposed within the band 36 in the indicia 30A at spaced intervals are triangular pointers or arrowheads 38 which point in the direction of increasing length and numbers 34. In the illustrated embodiment, the rule indicia use a foot and inch scale and the pointers are located at the half-inch graduation with the tail of the pointer being aligned with that graduation.

As seen in FIG. 1, the window 18 is cooperatively dimensioned and greater than one inch in length so that normally two pointers 38 will be visible therein. However, in some extended positions of the rule blade 26 such as that depicted in FIG. 4, only one pointer 38 may be visible. As will be appreciated, strength and mounting considerations dictate a limit in the size of the window 18 in the top wall 16 of the casing 10.

Figure 3:
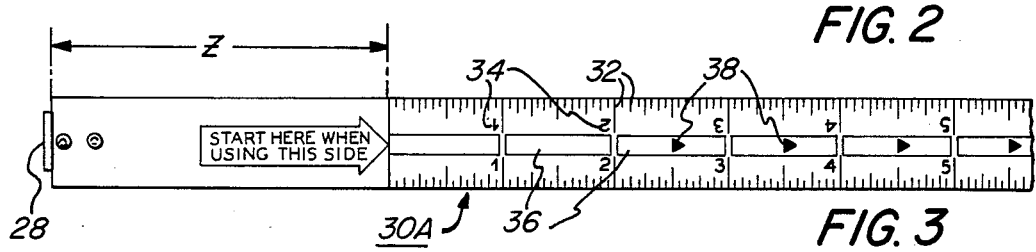
FIG. 3 is a fragmentary bottom view of the opposite rule blade surface.
Figure 4:
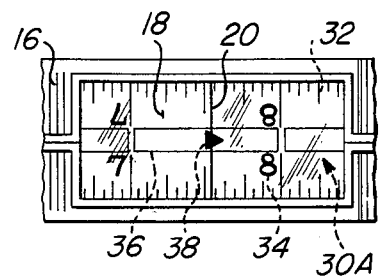
FIG. 4 is a fragmentary top view of the rule of FIG. 1.

The indicia 30A on the lower surface of the extended blade 26 as seen in FIG. 1, are offset from the outer end of the blade 26 or hook 28 a distance Z (as seen in FIG. 3) which is equal to the length of the intermediate portion of the blade 26, i.e., the blade path inwardly of the casing 10 from the outer surface of the front wall 14 about the aperture 22 and to the indicator line 20 on the window 18 minus the length Y of the bottom wall.

Figure 5:
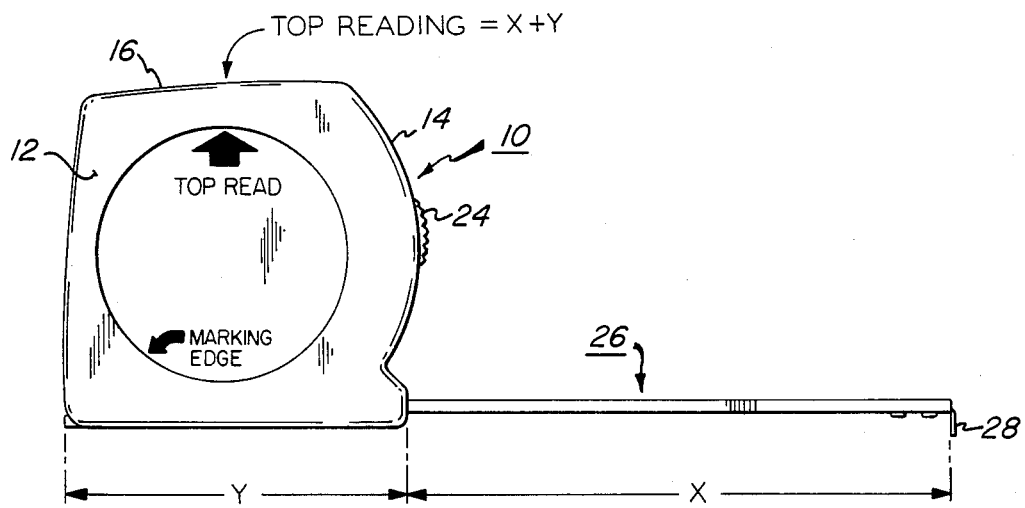
FIG. 5 is a partially diagrammatic view of the rule showing distance factors.

In using the top reading rule feature, the user is measuring the distance from the outer end of the blade 26 or hook 28 and the rear end of the casing 10, which is represented by the dimensions X+Y as seen in FIG. 5. However, the user may also merely measure the length along the extended blade 26 by reading the indicia 30 on the extended portion of the blade 26.

It is important that the band 36 be of a highly distinctive color relative to the color of the background for the indicia 30A, and that the pointers 38 be of a color distinct from that of the band so that the user's eye will be drawn to the pointers 38 and focus thereon. Exemplary of a suitable color format is a background of yellow, numerals and graduations of black, a band of black, and pointers of yellow. If so desired, the indicia 30, 30A can include stud markers in red at the appropriate spacing. For convenience, the pointers may comprise the background color by the process of imprinting the band segments.

In using the rule, the blade 26 is extended to encompass the distance to be measured. The user may read the indicia 30 on the top surface of the extended portion of the blade 26 as seen in FIG. 1, or read the indicia seen in the window 18 representing the extended lengths of the blade and the lengths of the casing. Because the graduations 32 and numbers 34 are provided along both side margins of the blade 26, they are easily read from any angle. The pointers 38 clearly indicate the direction of increasing length so that, in a condition where only one number is visible in the window 18, the user can avoid confusion as to the numeric value indicated by the graduation 32 disposed in registry with the indicator line 20.

Thus, it can be seen from the foregoing detailed specification and claims that the top reading rule of the present invention is one which is easy to use and read and provides a simple means for ensuring the numeric value represented by graduations intermediate the numbers provided by the top reading indicia of the rule. The rule may be read easily in three directions, and the user's eye is drawn to and focuses on the directional pointers.

I claim:

1. A top reading rule comprising:

A. a casing having side walls, top wall, bottom wall, front wall and rear wall defining an enclosure, said casing having a window in its top wall and a blade aperture adjacent the base of its front wall;

B. a rule blade coiled in said enclosure of said casing and having an outer end portion extending outwardly of said aperture and an intermediate portion extending within said enclosure inwardly along said bottom wall, upwardly along said rear wall and along said top wall under said window, said rule blade having a first set of measuring indicia on the face of said blade disposed upwardly as it extends outwardly of said aperture and a second set of measuring indicia on the other face thereof exposed as said blade extends under said window, said measuring indicia on said second set being offset from the outer end of said blade a distance equal to the length of said intermediate portion from said front wall to an indicium at said window minus the length of said bottom wall, whereby the distance between the outer end of the extended rule blade and the rear edge of the rule casing may be read at the point of registry of said blade visible through said casing window with said indicium at said window, said other face of said blade having a background of first color, said indicia of said second set being of a second color and including parallel graduations and numbers along the sides thereof, said numbers being disposed oppositely to facilitate viewing from either side of said blade, said indicia of said second set further including a centrally disposed, longitudinally extending band of a color distinct from said first color, and directional pointers spaced at intervals along the length of said band and disposed within the width of said band, said directional pointers being of a color distinct from that of said band and indicating the direction of increasing numbers, said intervals being of a length less than the length of said window to ensure that at least one of said pointers is always visible in said window to permit ready determination of the value of intermediate graduations between numbers along the length of said rule between numbers.

2. The top reading rule of claim 1 wherein said band is provided by discrete, spaced segments and said pointers are arrowheads disposed within said segments.

3. The top reading rule of claim 1 wherein the intervals are not greater than the spacing between numbers.

4. The top reading rule of claim 1 wherein said pointers are provided centrally of the spacing between numbers.

5. The top reading rule of claim 1 wherein said window has an indicator line thereon providing said indicium aligned with an indicium on said rule blade reflecting the measured length.

6. The top reading rule of claim 1 wherein said first set of indicia is generally similar to said second set except for the omission of said pointers.

7. A top reading rule comprising:
A. a casing having side walls, top wall, bottom wall, front wall and rear wall defining an enclosure, said casing having a window in its top wall and a blade aperture adjacent the base of its front wall;
B. a metallic ruled blade coiled in said enclosure of said casing and having an outer end portion extending outwardly of said aperture and an intermediate portion extending within said enclosure rearwardly along said bottom wall, upwardly along said rear wall and along said top wall under said window, said rule blade having a first set of measuring indicia on the face of said blade disposed upwardly as it extends outwardly of said aperture and a second set of measuring indicia on the other face thereof exposed as said blade extends under said window, said measuring indicia of said second set being offset from the outer end of said blade a distance equal to the length of said intermediate portion to an indicium at said window minus the length of said bottom wall, whereby the distance between the outer end of the extended rule blade and the rear edge of the rule casing may be read at the point of registry of said blade visible through said casing window with said indicium at said window, said other face of said blade having a background of a first color, said indicia of said second set being of a second color and including parallel graduations and numbers along the sides thereof, said numbers being disposed oppositely to facilitate viewing from either side of said blade, said indicia of said second set further including a centrally disposed, longitudinally extending band of a color distinct from said first color, and directional pointers spaced at intervals along the length and within the width of said band, said directional pointers being of a color distinct from that of said band and indicating the direction of increasing numbers, said intervals being of a length less than that of said window and the spacing between numbers, said window length and said intervals being cooperatively dimensioned to provide in most positions of extension two pointers visible in said window to permit ready determination of the value of intermediate graduations between numbers along the length of said rule between numbers.

8. The top reading rule of claim 7 wherein said pointers are provided centrally of the spacing between numbers.

9. The top reading rule of claim 7 wherein said window has an indicator line thereon providing said indicium aligned with an indicium on said rule blade reflecting the measured length.

10. The top reading rule of claim 7 wherein said first set of indicia is generally similar to said second set except for the omission of said pointers.

* * * * *